United States Patent
Wei et al.

(10) Patent No.: US 9,810,939 B2
(45) Date of Patent: Nov. 7, 2017

(54) REGIONAL POLARIZATION STRUCTURE, METHOD FOR FABRICATING REGIONAL POLARIZATION STRUCTURE AND LIQUID CRYSTAL DISPLAY PANEL

(71) Applicants: Xiamen Tianma Micro-Electronics Co., Ltd., Xiamen (CN); Tianma Micro-Electronics Co., Ltd., Shenzhen (CN)

(72) Inventors: Sifan Wei, Shanghai (CN); Zhongshou Huang, Shanghai (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 206 days.

(21) Appl. No.: 14/985,056

(22) Filed: Dec. 30, 2015

(65) Prior Publication Data

US 2017/0003428 A1 Jan. 5, 2017

(30) Foreign Application Priority Data

Jun. 30, 2015 (CN) .......................... 2015 1 0375179

(51) Int. Cl.
*G02F 1/1335* (2006.01)
*G02B 1/04* (2006.01)
(Continued)

(52) U.S. Cl.
CPC ......... *G02F 1/133528* (2013.01); *G02B 1/04* (2013.01); *G02B 5/3016* (2013.01);
(Continued)

(58) Field of Classification Search
CPC ........ G02F 2001/133545; G02F 2001/133548; G02F 2001/133538
See application file for complete search history.

(56) References Cited

U.S. PATENT DOCUMENTS

2009/0104832 A1 4/2009 Fu et al.
2014/0022638 A1* 1/2014 Wu .......................... G02B 5/30
359/483.01
(Continued)

FOREIGN PATENT DOCUMENTS

CN 101515091 A 8/2009
CN 101988973 A 3/2011
(Continued)

OTHER PUBLICATIONS

Chinese Application No. 201510375179.3, First Office Action dated May 17, 2017.

*Primary Examiner* — Phu Vu
(74) *Attorney, Agent, or Firm* — Alston & Bird LLP (57) ABSTRACT

A regional polarization structure, a method for fabricating a regional polarization structure and a liquid crystal display panel are provided. The regional polarization structure includes: a substrate; at least one first carbon nanotube block arranged on a first side of the substrate, where the at least one first carbon nanotube block includes multiple carbon nanotubes extended in a first direction; a first adhesive layer arranged between the substrate and the at least one first carbon nanotube block; at least one second carbon nanotube block arranged on a second side of the substrate, where the at least one second carbon nanotube block includes multiple carbon nanotubes extended in a second direction; and a second adhesive layer arranged between the substrate and the at least one second carbon nanotube block, where projections of the at least one first carbon nanotube block
(Continued)

and the at least one second carbon nanotube block on the substrate do not overlap, and the first direction is not parallel with the second direction.

20 Claims, 10 Drawing Sheets (51) Int. Cl.
  *G02B 5/30* (2006.01)
  *G02F 1/1337* (2006.01)
  *B82Y 30/00* (2011.01)
(52) U.S. Cl.
  CPC ........ *G02F 1/133707* (2013.01); *B82Y 30/00* (2013.01); *G02F 2001/133538* (2013.01); *G02F 2001/133565* (2013.01); *G02F 2202/36* (2013.01); *Y10S 977/952* (2013.01)

(56) References Cited

U.S. PATENT DOCUMENTS

| | | | |
|---|---|---|---|
| 2016/0109754 A1* | 4/2016 | Seike | G02F 1/133528 349/96 |
| 2016/0238766 A1 | 8/2016 | Huang et al. | |
| 2017/0219754 A1* | 8/2017 | Di | G02B 5/3041 |

FOREIGN PATENT DOCUMENTS

| | | |
|---|---|---|
| CN | 102207575 A | 10/2011 |
| CN | 103576370 A | 2/2014 |
| CN | 104698524 A | 6/2015 |
| TW | 201200937 A1 | 1/2012 |

\* cited by examiner

REGIONAL POLARIZATION STRUCTURE, METHOD FOR FABRICATING REGIONAL POLARIZATION STRUCTURE AND LIQUID CRYSTAL DISPLAY PANEL

CROSS REFERENCE TO RELATED APPLICATIONS

The present application claims priority to Chinese Patent Application No. 201510375179.3, entitled "REGIONAL POLARIZATION STRUCTURE, METHOD FOR FABRICATING REGIONAL POLARIZATION STRUCTURE AND LIQUID CRYSTAL DISPLAY PANEL", filed on Jun. 30, 2015 with the State Intellectual Property Office of People's Republic of China, which is incorporated herein by reference in its entirety.

FIELD OF THE INVENTION

The present disclosure relates to the technical field of the liquid crystal display, and in particular to a regional polarization structure, a method for fabricating the regional polarization structure and a liquid crystal display panel including the regional polarization structure.

BACKGROUND OF THE INVENTION

Figure 1:
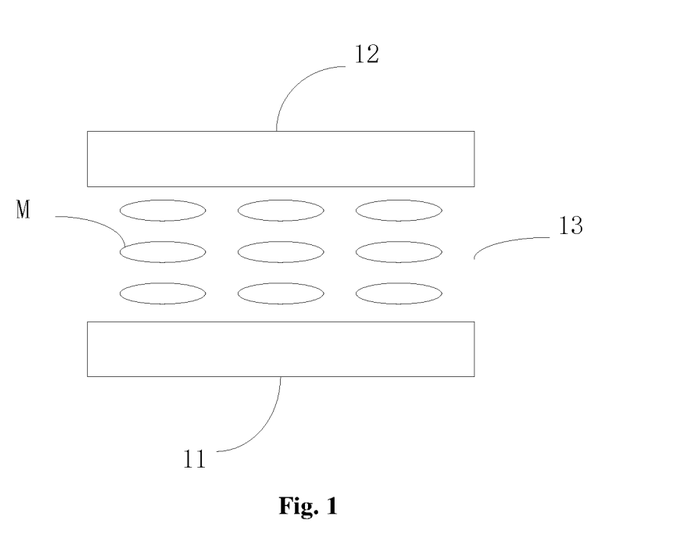
FIG. 1 is a schematic structural diagram of a liquid crystal display panel according to the conventional technology.

A liquid crystal display panel has advantages of being ultrathin, a great size screen display, low power consumption, no radiation and a high resolution, which is a kind of current mainstream display device and widely applied to various types of electronic devices. As shown in FIG. 1, the liquid crystal display panel according to known technology includes: a TFT array substrate 11 and a color filter substrate 12 disposed oppositely; and a liquid crystal layer 13 disposed between the TFT array substrate 11 and the color filter substrate 12.

It should be noted that, in a conventional liquid crystal display panel, in order to display an image normally, an alignment layer needs to be provided on a side of the TFT array substrate 11 facing the liquid crystal layer, such that liquid crystal molecules M have an initial deflection angle. In practice, the alignment layer of the existing liquid crystal display panel provides a uniform alignment direction at various positions, hence it is difficult to meet the requirement of different alignments at different positions of the liquid crystal display panel, thereby preventing the liquid crystal display panel from improving a display quality.

BRIEF SUMMARY OF THE INVENTION

In order to solve the above technical problem, a regional polarization structure, a method for fabricating a regional polarization structure and a liquid crystal display panel including the regional polarization structure are provided according to embodiments of the present disclosure, thereby solving the problem that the alignment layer of the existing liquid crystal display panel has a uniform alignment direction at various positions, By having a uniform alignment direction, it is difficult to meet the requirement of different alignments at different positions of the liquid crystal display panel, which prevented the liquid crystal display panel from an improved display quality.

In order to solve the above problem, the following technical solutions are provided according to the embodiments of the present disclosure.

A regional polarization structure is provided, which includes:

a substrate;

at least one first carbon nanotube block arranged on a first side of the substrate, where the first carbon nanotube block includes multiple carbon nanotubes extended in a first direction;

a first adhesive layer arranged between the substrate and the first carbon nanotube block, which is configured to fixedly connect the substrate with the first carbon nanotube block;

at least one second carbon nanotube block arranged on a second side of the substrate, where the second carbon nanotube block includes multiple carbon nanotubes extended in a second direction, and the second side is a side of the substrate opposite to the first side; and a second adhesive layer arranged between the substrate and the second carbon nanotube block, which is configured to fixedly connect the substrate with the second carbon nanotube block, at least one second carbon nanotube block arranged on a second side of the substrate, where the second carbon nanotube block includes multiple carbon nanotubes extended in a second direction, and the second side is a side of the substrate opposite to the first side; and a second adhesive layer arranged between the substrate and the second carbon nanotube block, which is configured to fixedly connect the substrate with the second carbon nanotube block, where a projection of the first carbon nanotube block on the substrate is not overlapped with a projection of the second carbon nanotube block on the substrate, and the first direction is not parallel to the second direction.

A method for fabricating a regional polarization structure is provided, which is applied to the regional polarization structure described above, and the method includes:

preparing a substrate;

applying a first adhesive layer to a first lateral surface of the substrate;

disposing a first carbon nanotube film on a side of the first adhesive layer away from the substrate;

etching the first carbon nanotube film to form at least one first carbon nanotube block, where the first carbon nanotube block includes multiple carbon nanotubes extended in a first direction;

applying a second adhesive layer to a second lateral surface of the substrate, where the second lateral surface is a side of the substrate opposite to the first lateral surface;

disposing a second carbon nanotube film on a side of the second adhesive layer away from the substrate; and etching the second carbon nanotube film to form at least one second carbon nanotube block, where the second carbon nanotube block includes multiple carbon nanotubes extended in a second direction, where a projection of the first carbon nanotube block on the substrate is not overlapped with a projection of the second carbon nanotube block on the substrate, and the first direction is not parallel to the second direction.

A method for fabricating a regional polarization structure is provided, which is applied to the regional polarization structure described above, and the method includes:

preparing a support plate;

laying a first carbon nanotube film on a surface of the support plate;

etching the first carbon nanotube film to form at least one first carbon nanotube block, wherein the first carbon nanotube block comprises a plurality of carbon nanotubes extended in a first direction;

applying a first adhesive layer to a surface of the first carbon nanotube film away from the support plate;

forming a substrate on a surface of the first adhesive layer away from the first carbon nanotube film;

applying a second adhesive layer to a surface of the substrate away from the first adhesive layer;

laying a second carbon nanotube film on a surface of the second adhesive layer away from the substrate; and etching the second carbon nanotube film to form at least one second carbon nanotube block, wherein the second carbon nanotube block comprises a plurality of carbon nanotubes extended in a second direction, where a projection of the first carbon nanotube block on the substrate is not overlapped with a projection of the second carbon nanotube block on the substrate, and the first direction is not parallel with the second direction.

A liquid crystal display panel is provided, which includes the regional polarization structure described above.

As compared with the conventional technology, the technical solutions have some advantages hereinafter.

The regional polarization structure according to the embodiments of the present disclosure includes: a substrate; at least one first carbon nanotube block arranged on a first side of the substrate; and at least one second carbon nanotube block arranged on a second side of the substrate, where the first carbon nanotube block includes multiple carbon nanotubes extended in a first direction, the second carbon nanotube block includes multiple carbon nanotubes extended in a second direction, and the first direction is different from the second direction, i.e., the first carbon nanotube block and the second carbon nanotube block have different alignment directions. In this way, the regional polarization structure has different alignments at different regions according to the embodiments of the present disclosure, and thereby a liquid crystal display panel including the regional polarization structure has different alignments at different regions, so as to meet the requirement of different alignments at different positions of the liquid crystal display panel, and solve the problem of preventing the liquid crystal display panel from improving a display quality due to the same alignment direction at different positions of the alignment layer of the existing liquid crystal display panel.

In addition, with the regional polarization structure according to the embodiments of the present disclosure, the substrate is fixedly bonded to the first carbon nanotube block via the first adhesive layer, thereby increasing a bonding strength between the substrate and the first carbon nanotube block, and enhancing firmness between the substrate and the first carbon nanotube block.

Similarly, with the regional polarization structure according to the embodiments of the present disclosure, the substrate is fixedly bonded to the second carbon nanotube block via the second adhesive layer, thereby increasing a bonding strength between the substrate and the second carbon nanotube block, and enhancing firmness between the substrate and the second carbon nanotube block.

BRIEF DESCRIPTION OF THE DRAWINGS

In order to illustrate technical solutions of embodiments of the present disclosure or the conventional technology more clearly, hereinafter drawings to be used in the description of the embodiments or the conventional technology are introduced briefly. Apparently, the drawings described below only describe some embodiments of the present disclosure, and other drawings may be obtained based on these drawings by those skilled in the art without any creative work.

DETAILED DESCRIPTION OF THE INVENTION

Hereinafter technical solutions of embodiments of the present disclosure will be described clearly and completely in conjunction with the drawings of the embodiments of the present disclosure. The described embodiments are only some embodiments of the present disclosure rather than all the embodiments. Any other embodiments obtained based on the embodiments of the present disclosure by those skilled in the art without any creative work fall within the scope of protection of the present disclosure.

In order to understand the present disclosure sufficiently, many details are set forth in the following description, but the present disclosure may be implemented by other ways different from the ways described here. Those skilled in the art may make similar popularization without deviating from the concept of the present disclosure, therefore the preset disclosure is not limited to specific embodiments disclosed hereinafter.

As described in the background, the alignment layer of the existing liquid crystal display panel provides a uniform alignment direction at various positions, hence it is difficult to meet the requirement of different alignments at different positions of the liquid crystal display panel, thereby preventing the liquid crystal display panel from improving a display quality.

Figure 2:
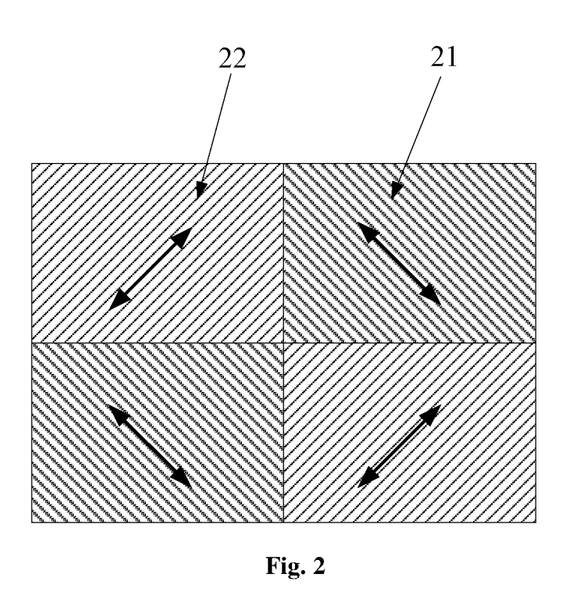
FIG. 2 is a top view of a regional polarization structure according to an embodiment of the present disclosure.
Figure 3:
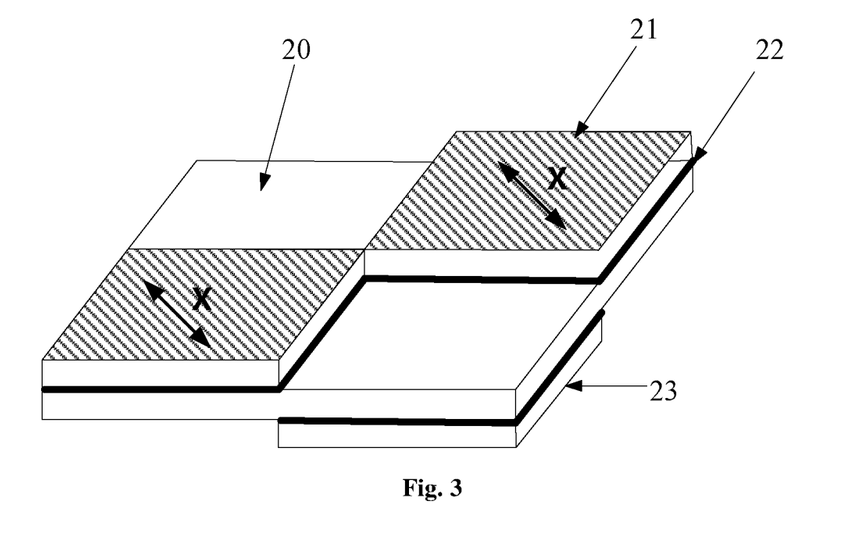
FIG. 3 is a partial cross section view of a regional polarization structure according to an embodiment of the present disclosure.
Figure 4:
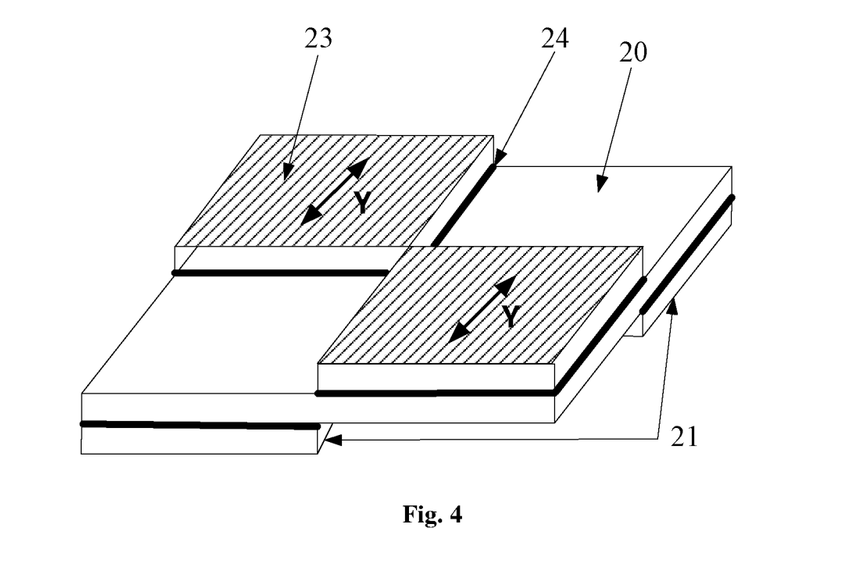
FIG. 4 is a partial cross section view of a regional polarization structure according to an embodiment of the present disclosure.
Figure 5:
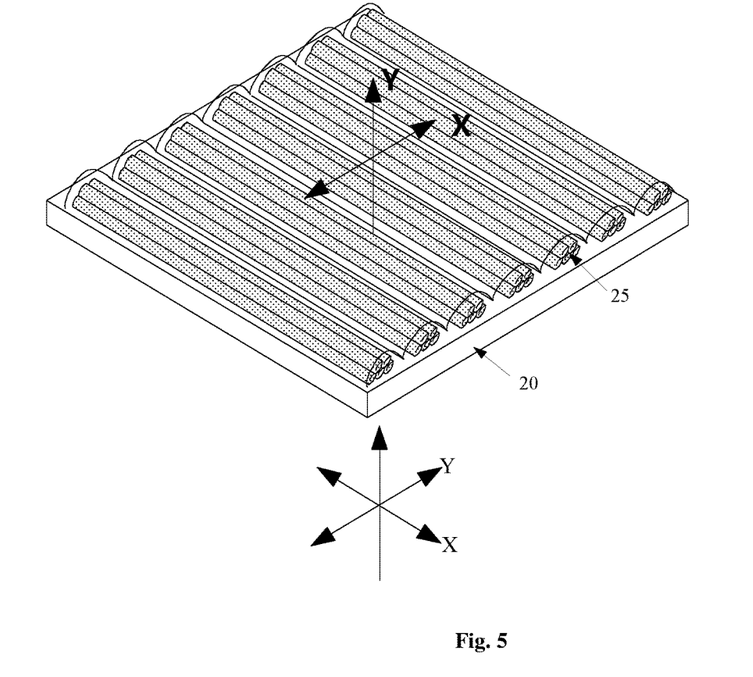
FIG. 5 is a schematic structural diagram of a first carbon nanotube block in a regional polarization structure according to an embodiment of the present disclosure.
Figure 6:
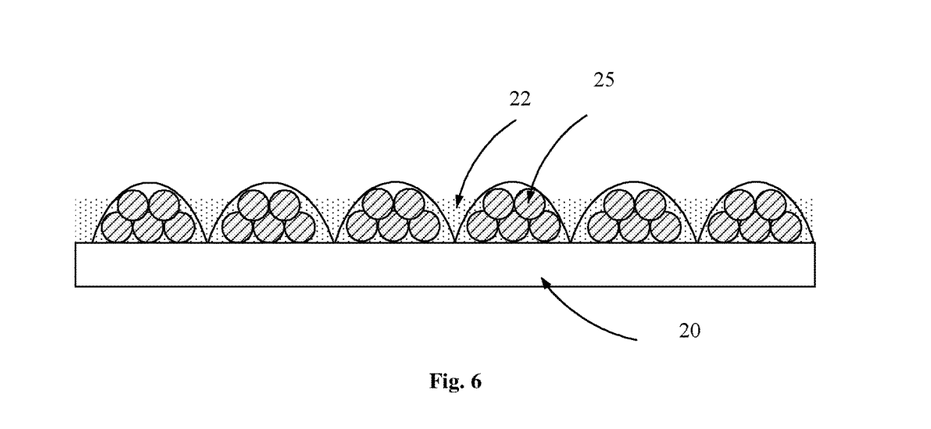
FIG. 6 is a cross section view of the first carbon nanotube block shown in FIG. 5.

In view of this, a regional polarization structure is provided according to an embodiment of the present disclosure. As shown in FIG. 2 to FIG. 4, the regional polarization structure includes: a substrate 20; at least one first carbon nanotube block 21 arranged on a first side of the substrate 20, where the first carbon nanotube block 21 includes multiple carbon nanotubes 25 extended in a first direction X, as shown in FIGS. 5 and 6; a first adhesive layer 22 arranged between the substrate 20 and the first carbon nanotube block 21, and configured to fixedly connect the substrate 20 with the first carbon nanotube block 21; at least one second carbon nanotube block 23 arranged on a second side of the substrate 20, where the second carbon nanotube block 23 includes multiple carbon nanotubes extended in a second direction Y, where the second side is a side of the substrate 20 opposite to the first side; and a second adhesive layer 24 arranged between the substrate 20 and the second carbon nanotube block 23, which is configured to fixedly connect the substrate 20 with the second carbon nanotube block 23.

Figure 7:
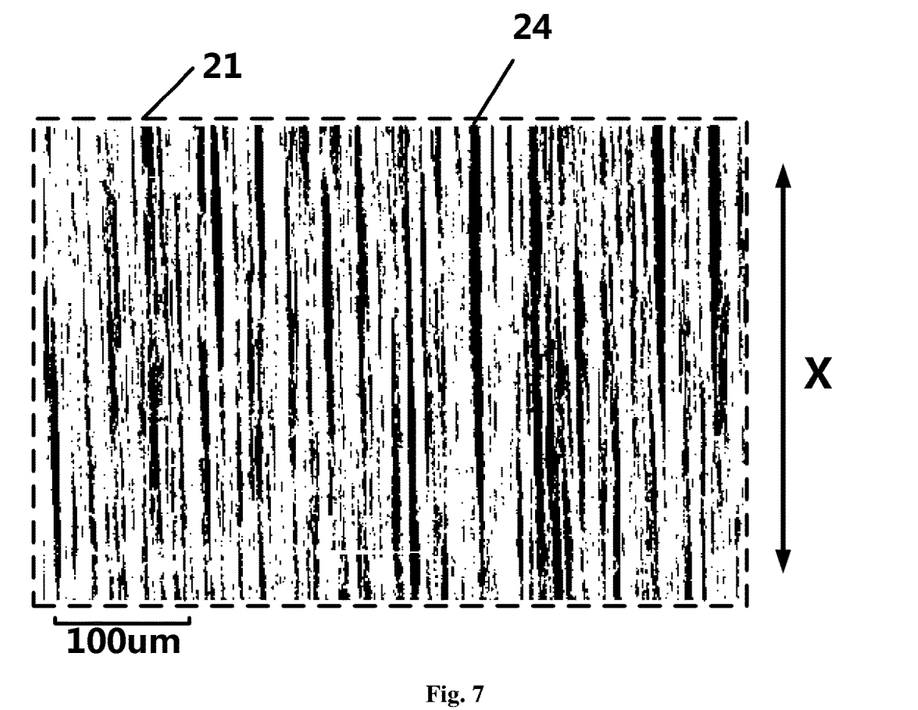
FIG. 7 is a schematic structural diagram of the carbon nanotube shown in FIG. 6 under a microscope.

It should be noted that in the embodiment of the present disclosure, as shown in FIG. 7, adjacent carbon nanotubes 25 in the first carbon nanotube block 21 are connected to each other by van der Waals force. That is, each carbon nanotube 25 in the first carbon nanotube block 21 is connected to its adjacent carbon nanotube end to end in its extension direction (i.e., the first direction) by van der Waals force. In addition, the carbon nanotube 25 is also connected to its adjacent carbon nanotube in a direction perpendicular to the first direction by van der Waals force, thereby forming a continuous self-supported film structure.

Since all the carbon nanotubes 25 in the first carbon nanotube block 21 are extended in the first direction, multiple grooves extended in the first direction are formed between the parallel carbon nanotubes. These grooves may be used to provide an initial alignment for liquid crystal molecules.

Similarly, adjacent carbon nanotubes in the second carbon nanotube block 23 are also connected to each other by van der Waals force. That is, each carbon nanotube in the second carbon nanotube block 23 is connected to its adjacent carbon nanotube end to end in its extension direction (i.e., the second direction) by van der Waals force. In addition, each carbon nanotube in the second carbon nanotube block 23 is also connected to its adjacent carbon nanotube in a direction perpendicular to the second direction by van der Waals force, thereby forming a continuous self-supported film structure.

Since all the carbon nanotubes in the second carbon nanotube block 23 are extended in the second direction, multiple grooves extended in the second direction are formed between the parallel carbon nanotubes. These grooves are also used to provide an initial alignment for liquid crystal molecules.

Since the first direction is not parallel with the second direction, in the regional polarization structure according to the embodiment of the present disclosure, a region corresponding to the first carbon nanotube block 21 and a region corresponding to the second carbon nanotube block 23 have different alignment directions. In this way, alignments of different regions in the regional polarization structure according to the embodiment of the present disclosure are different, and further alignments of different regions in a liquid crystal display panel including the regional polarization structure are different, so as to meet the requirement of different alignments of different positions in the liquid crystal display panel, thereby solving the problem of preventing the liquid crystal display panel from improving a display quality due to the same alignment at various positions of the alignment layer of the existing liquid crystal display panel.

It should be noted that, in the embodiment of the present disclosure, a projection of the first carbon nanotube block 21 on the substrate is not overlapped with a projection of the second carbon nanotube block 23 on the substrate 20, to ensure that a region corresponding to one block of the regional polarization structure has only one alignment direction.

In addition, in the regional polarization structure according to the embodiment of the present disclosure, the substrate 20 is fixedly bonded to the first carbon nanotube block 21 via the first adhesive layer 22, thereby increasing a bonding strength between the substrate 20 and the first carbon nanotube block 21, and enhancing firmness between the substrate 20 and the first carbon nanotube block 21.

Similarly, in the regional polarization structure according to the embodiment of the present disclosure, the substrate 20 is fixedly bonded to the second carbon nanotube block 23 via the second adhesive layer 24, thereby increasing a bonding strength between the substrate 20 and the second carbon nanotube block 23, and enhancing firmness between the substrate 20 and the second carbon nanotube block 23.

Since the photo-alignment base material has both an adhesion function and an alignment function, in an embodiment of the present disclosure based on any embodiment above, at least one of the first adhesive layer 22 and the second adhesive layer 24 includes a photo-alignment base material. Specifically, in an example of the embodiment, the first adhesive layer 22 is made of the photo-alignment base material, thereby improving a bonding strength between the substrate 20 and the first carbon nanotube block 21, ensuring firmness between the substrate 20 and the first carbon nanotube block 21, and improving photo-alignment accuracy of a region corresponding to the first carbon nanotube block 21. In another example of the embodiment, the second adhesive layer 24 is made of the photo-alignment base material, thereby improving a bonding strength between the substrate 20 and the second carbon nanotube block 23, ensuring firmness between the substrate 20 and the second carbon nanotube block 23, and improving photo-alignment accuracy of a region corresponding to the second carbon nanotube block 23. In still another example of the embodiment, both the first adhesive layer 22 and the second adhesive layer 24 are made of the photo-alignment base material, thereby ensuring the firmness between the substrate 20 and the first carbon nanotube block 21 and between the firmness between the substrate 20 and the second carbon nanotube block 23, and improving the photo-alignment accuracy of the region corresponding to the first carbon nanotube block 21 and the photo-alignment accuracy of the region corresponding to the second carbon nanotube block 23.

It should be noted that, in an embodiment of the present disclosure, in a case that the first adhesive layer 22 and/or the second adhesive layer 24 are/is made of the photo-alignment base material, an orientation of the photo-alignment base material is the same as an extension direction of carbon nanotubes in the carbon nanotube block corresponding to the photo-alignment base material. Specifically, in the case that the first adhesive layer 22 is made of the photo-alignment base material, the orientation of the photo-alignment base material is the same as the extension direction of carbon nanotubes in the first carbon nanotube block 21. In the case that the second adhesive layer 24 is made of the photo-alignment base material, the orientation of the photo-alignment base material is the same as an extension direction of carbon nanotubes in the second carbon nanotube block 23. In the case that both the first adhesive layer 22 and the second adhesive layer 24 are made of the photo-alignment base material, the orientation of the photo-alignment base material of the first adhesive layer 22 is the same as the extension direction of carbon nanotubes in the first carbon nanotube block 21, and the orientation of the photo-alignment base material of the second adhesive layer 24 is the same as the extension direction of carbon nanotubes in the second carbon nanotube block 23.

Based on any embodiment above, in an optional embodiment of the present disclosure, the photo-alignment base material may be fabricated from one or more of a cellulose triacetate, a polyimide and a polyamide acid, which is not limited in the present disclosure and depends on specific cases.

Figure 8:
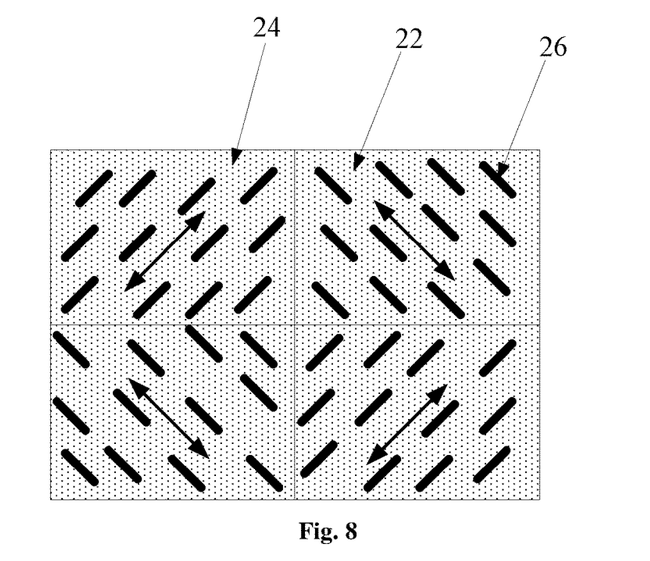
FIG. 8 is a top view of a photo-alignment base material doped with a dichroic dye in a regional polarization structure according to an embodiment of the present disclosure.

Based on any embodiment above, in an embodiment of the present disclosure, in the case that the first adhesive layer 22 and/or the second adhesive layer 24 are/is made of a photo-alignment base material, the photo-alignment base material is doped with a dichroic dye 26, as shown in FIG. 8. It should be noted that, under an irradiation of a natural light, the dichroic dye 26 may transmit light in one polarization direction and block light in another polarization direction, thus the photo-alignment base material doped with the dichroic dye 26 has both the alignment function and the polarization function. It should be further noted that, in the embodiment, a polarization direction of the dichroic dye 26 is the same as the orientation of the photo-alignment base material doped with the dichroic dye.

Based on the above embodiments, in an optional embodiment of the present disclosure, a dichroic ratio of the dichroic dye 26 is not less than 7, which is not limited in the present disclosure and depends on specific cases.

Based on the above embodiments, in an embodiment of the present disclosure, the dichroic dye 26 includes one or more of an azo dye, an anthraquinone dye, a biphenyl dye, a triphendioxazine and derivative dye, a monomethine dye, a polymethine dye and a polycyclic dye, which is not limited in the present disclosure and depends on specific cases.

Based on any embodiment above, in an embodiment of the present disclosure, the substrate 20 has a transparent insulation structure. In another embodiment of the present disclosure, the substrate 20 has a translucent insulation structure. In an optional embodiment of the present disclosure, the substrate 20 is made of an insulation oxide. More optionally, the substrate 20 is made of silicon dioxide, which is not limited in the present disclosure and depends on specific cases, as long as the substrate 20 has certain transparency and has an insulation structure.

Based on any embodiment above, in an embodiment of the present disclosure, an angle between the first direction and the second direction is greater than 0 degrees and not greater than 90 degrees; and optionally, is 90 degrees, which is not limited in the present disclosure and depends on specific cases.

Based on any embodiment above, in an embodiment of the present disclosure, multiple first carbon nanotube blocks 21 may be disposed at a first side of the substrate 20. In an optional embodiment of the present disclosure, in the case that multiple first carbon nanotube blocks 21 are disposed at the first side of the substrate 20, adjacent first carbon nanotube blocks 21 are connected in a direction of a diagonal line of each first carbon nanotube block 21. Similarly, multiple second carbon nanotube blocks 23 may also be disposed at a second side of the substrate 20. In an optional embodiment of the present disclosure, in the case that multiple second carbon nanotube blocks 23 are disposed at the second side of the substrate 20, adjacent second carbon nanotube blocks 23 are connected in a direction of a diagonal line of each second carbon nanotube block 23.

Based on any embodiment above, in an embodiment of the present disclosure, the regional polarization structure may further include: a support plate (not shown in Figures) arranged on a side of the first carbon nanotube block 21 away from the substrate 20, which is configured to support a structure including the first carbon nanotube block 21, the substrate 20 and the second carbon nanotube block 23. The present disclosure is not limited to the above case, in other embodiments of the present disclosure, the regional polarization structure may not include the support plate, which depends on specific cases.

Accordingly, a liquid crystal display panel is provided according to an embodiment of the present disclosure, which includes at least one regional polarization structure according to any embodiment above.

Hereinafter the liquid crystal display panel according to the embodiment of the present disclosure will be illustrated by taking the regional polarization structure without the support plate as an example.

Figure 9:
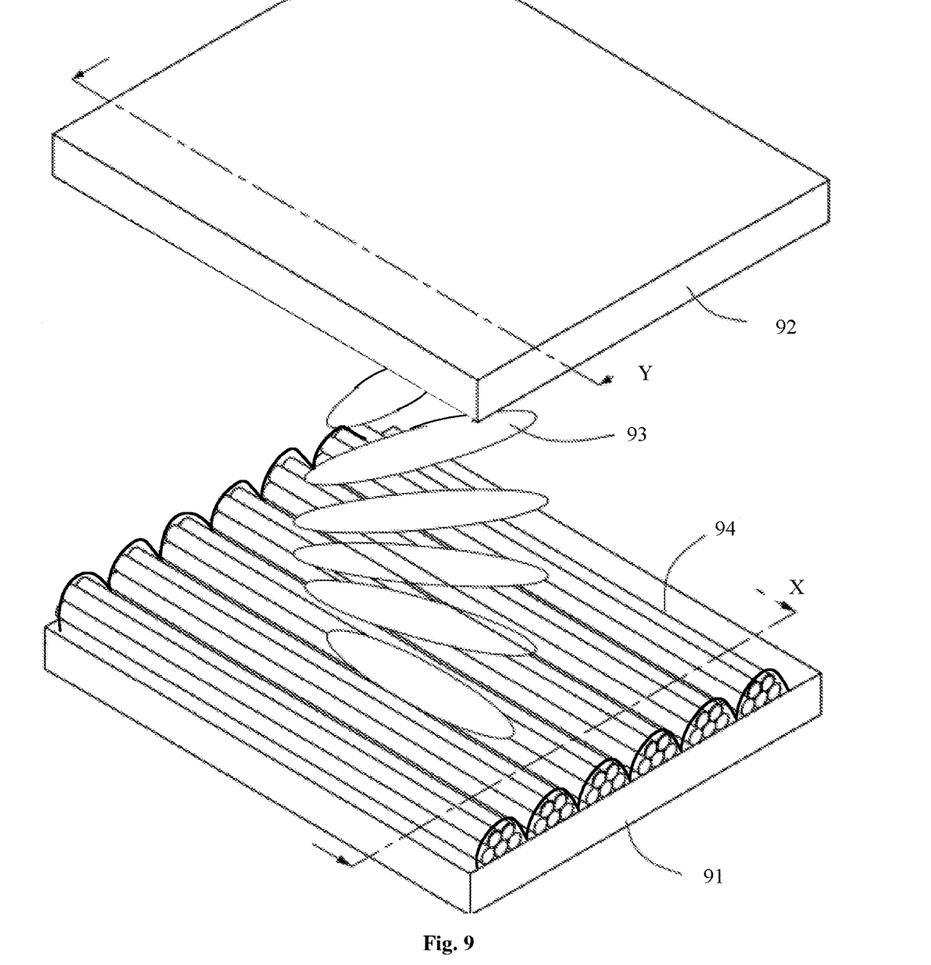
FIG. 9 is a schematic partial structural diagram of a liquid crystal display panel according to an embodiment of the present disclosure.
Figure 10:
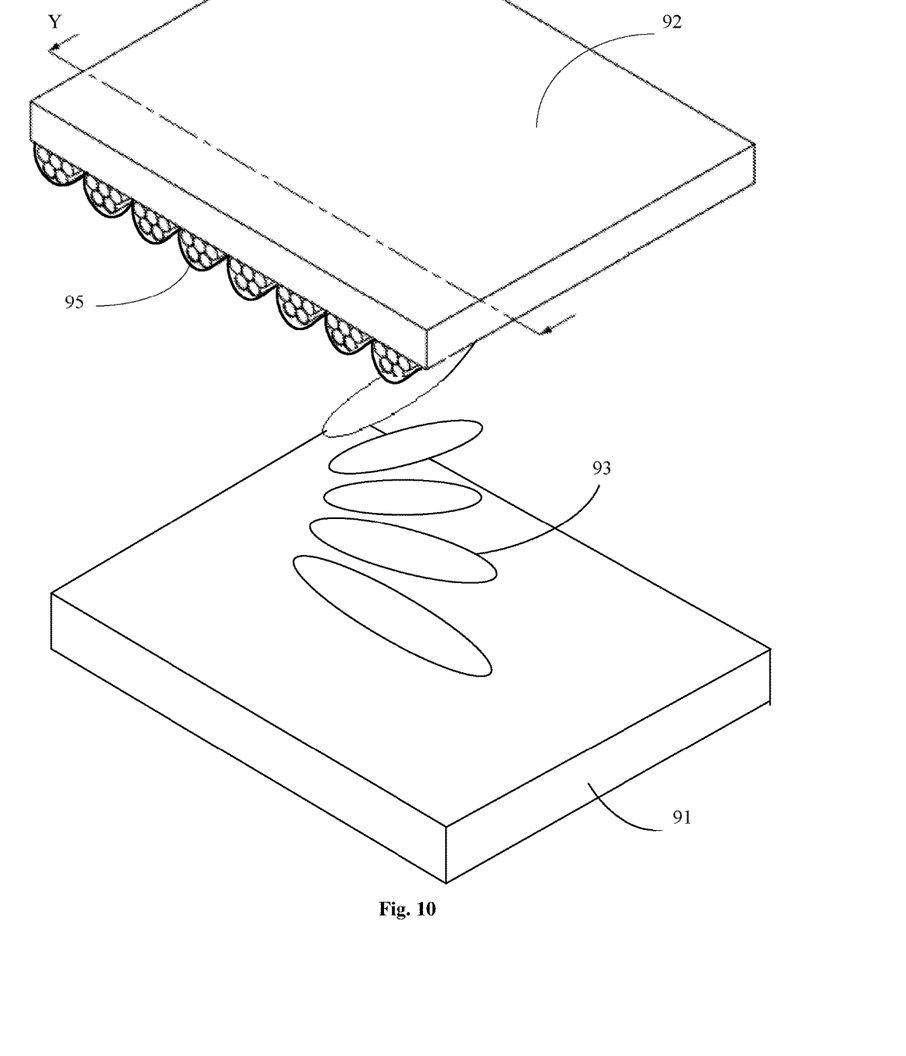
FIG. 10 is a schematic partial structural diagram of a liquid crystal display panel according to embodiment of the present disclosure.
Figure 11:
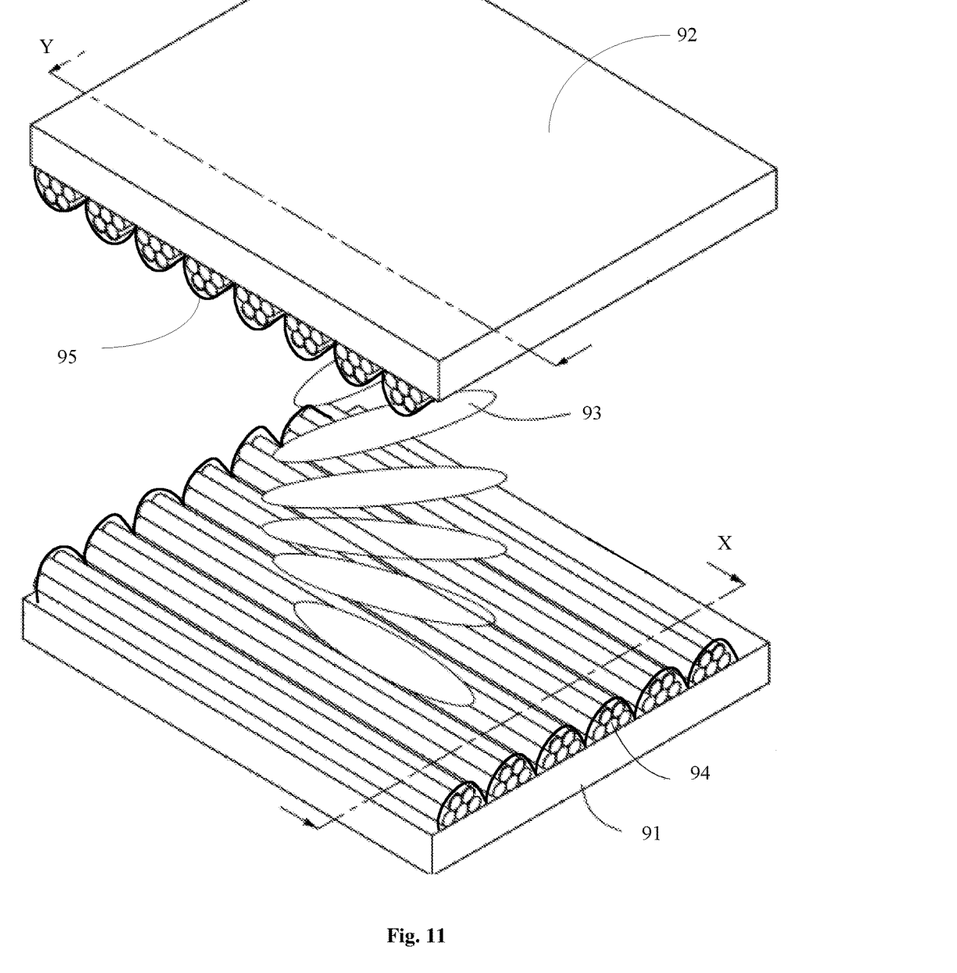
FIG. 11 is a schematic partial structural diagram of a liquid crystal display panel according to an embodiment of the present disclosure.

As shown in FIG. 9 to FIG. 11, the liquid crystal display panel is provided according to an embodiment of the present disclosure, which includes: an array substrate 91 and a color filter substrate 92 disposed oppositely; a liquid crystal layer 93 arranged between the array substrate 91 and the color filter substrate 92; a first alignment layer 94 arranged on a side of the array substrate 91 facing the liquid crystal layer 93; and a second alignment layer 95 arranged on a side of the color filter substrate 92 facing the liquid crystal layer 93, where the regional polarization structure according to any embodiment above of the present disclosure is adopted in at least one of the first alignment layer 94 and the second alignment layer 95.

Based on the above embodiments, in an embodiment of the present disclosure, the liquid crystal display panel includes one regional polarization structure according to any embodiment above of the present disclosure. In an embodiment of the present disclosure, the regional polarization structure is adopted in the first alignment layer 94, as shown in FIG. 9; and in another embodiment of the present disclosure, the regional polarization structure is adopted in the second alignment layer 95, as shown in FIG. 10, which is not limited in the present disclosure and depends on specific cases.

In another embodiment of the present disclosure, the liquid crystal display panel includes two regional polarization structures according to any embodiment above of the present disclosure. In an embodiment of the present disclosure, the regional polarization structure is adopted in both the first alignment layer 94 and the second alignment layer 95, as shown in FIG. 11.

It should be noted that, in the case that the regional polarization structure includes a support plate, the regional polarization structure is also adapted to the liquid crystal display panel according to the embodiments above of the present disclosure, which is not described herein. It should be further noted that, in the case that the regional polarization structure includes a support panel, the array substrate and/or the color filter substrate in the liquid crystal display panel may function as the support plate to reduce a thickness of the liquid crystal display panel, thereby meeting a requirement of a light and thin liquid crystal display panel, which is not limited in the present disclosure and depends on specific cases.

In summary, the regional polarization structure and the liquid crystal display panel including the regional polarization structure according to the embodiments of the present disclosure include: a substrate 20; at least one first carbon nanotube block 21 arranged on a first side of the substrate 20; and at least one second carbon nanotube block 23 arranged on a second side of the substrate 20, where the first carbon nanotube block 21 includes multiple carbon nanotubes extended in the first direction, the second carbon nanotube block 23 includes multiple carbon nanotubes extended in the second direction, and the first direction is different from the second direction, i.e., the alignment direction of the first carbon nanotube block 21 is different from the alignment direction of the second carbon nanotube block 23. In this way, the regional polarization structure according to the embodiments of the present disclosure has different alignments at different regions; and therefore the liquid crystal display panel including the regional polarization structure has different alignments at different regions, so as to meet the requirement of different alignments at different positions of the liquid crystal display panel and solve the problem of preventing the liquid crystal display panel from improving a display quality due to the same alignment direction at various positions of the alignment layer of the existing liquid crystal display panel.

In addition, in the regional polarization structure according to the embodiments of the present disclosure, the substrate 20 is fixedly bonded to the first carbon nanotube block 21 via the first adhesive layer 21, thereby increasing a bonding strength between the substrate 20 and the first carbon nanotube block 21, and increasing firmness between the substrate 20 and the first carbon nanotube block 21.

Similarly, in the regional polarization structure according to the embodiments of the present disclosure, the substrate 20 is fixedly banded to the second carbon nanotube block 23 via the second adhesive layer 24, thereby increasing a banding strength between the substrate 20 and the second carbon nanotube block 23, and enhancing firmness between the substrate 20 and the second carbon nanotube block 23.

In addition, a method for fabricating a regional polarization structure is further provided according to an embodiment of the present disclosure, which is applied to the regional polarization structure according to any above embodiment.

Figure 12:
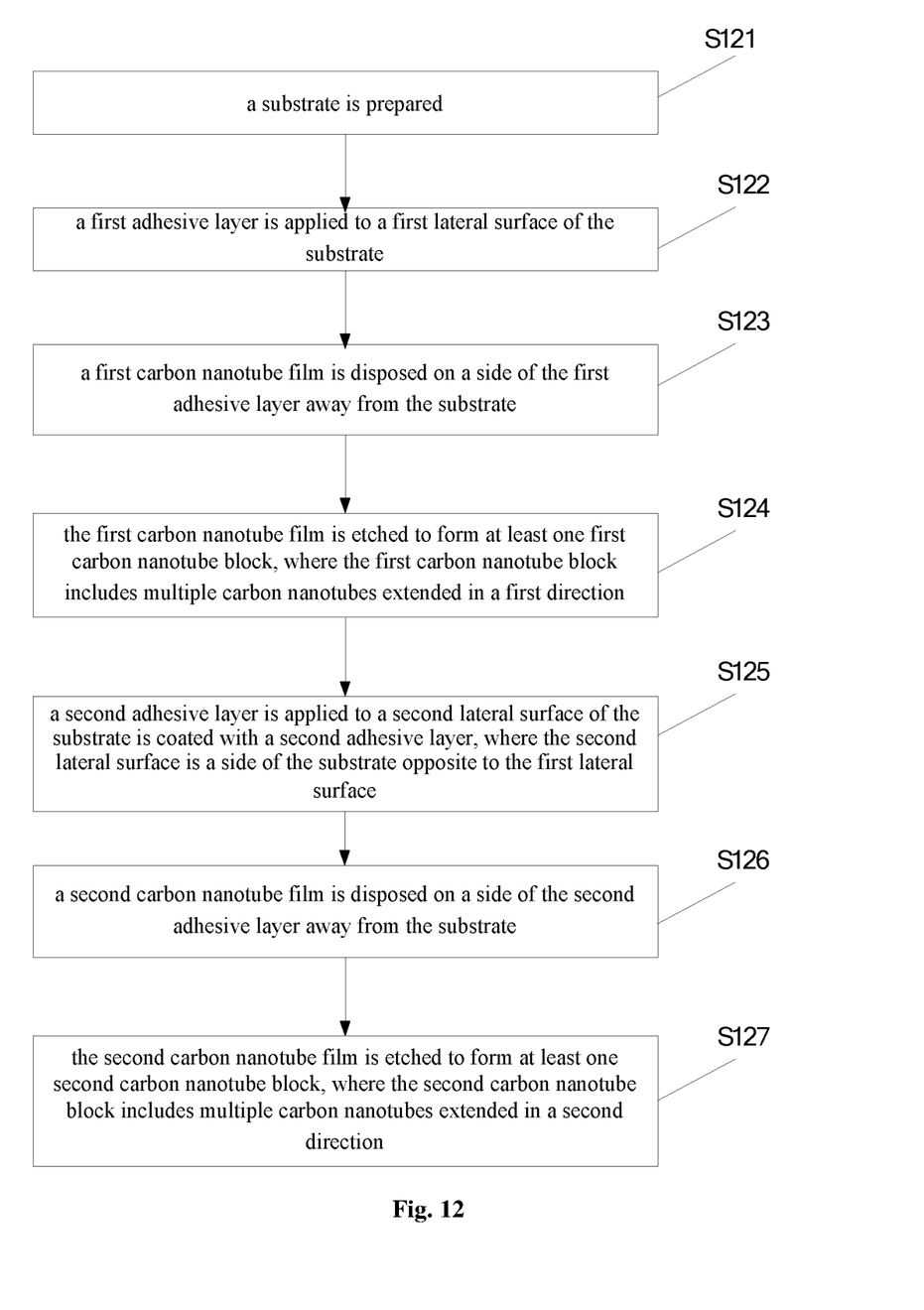
FIG. 12 is a flowchart of a method for fabricating a regional polarization structure according to an embodiment of the present disclosure.

In an embodiment of the present disclosure, the regional polarization structure does not include a support plate. As shown in FIG. 12, in the embodiment, the method for fabricating the regional polarization structure includes steps of step S121 to step S127, and the method is not limited to this sequence.

In step S121, a substrate is prepared.

In step S122, a first adhesive layer is applied to a first lateral surface of the substrate.

In step S123, a first carbon nanotube film is disposed on a side of the first adhesive layer away from the substrate.

In step S124, the first carbon nanotube film is etched to form at least one first carbon nanotube block, where the first carbon nanotube block includes multiple carbon nanotubes extended in a first direction.

In step S125, a second adhesive layer is applied to a second lateral surface of the substrate, where the second lateral surface is a side of the substrate opposite to the first lateral surface.

In step S126, a second carbon nanotube film is disposed on a side of the second adhesive layer away from the substrate.

In step S127, the second carbon nanotube film is etched to form at least one second carbon nanotube block, where the second carbon nanotube block includes multiple carbon nanotubes extended in a second direction.

A projection of the first carbon nanotube block on the substrate is not overlapped with a projection of the second carbon nanotube block on the substrate, and the first direction is not parallel with the second direction.

Figure 13:
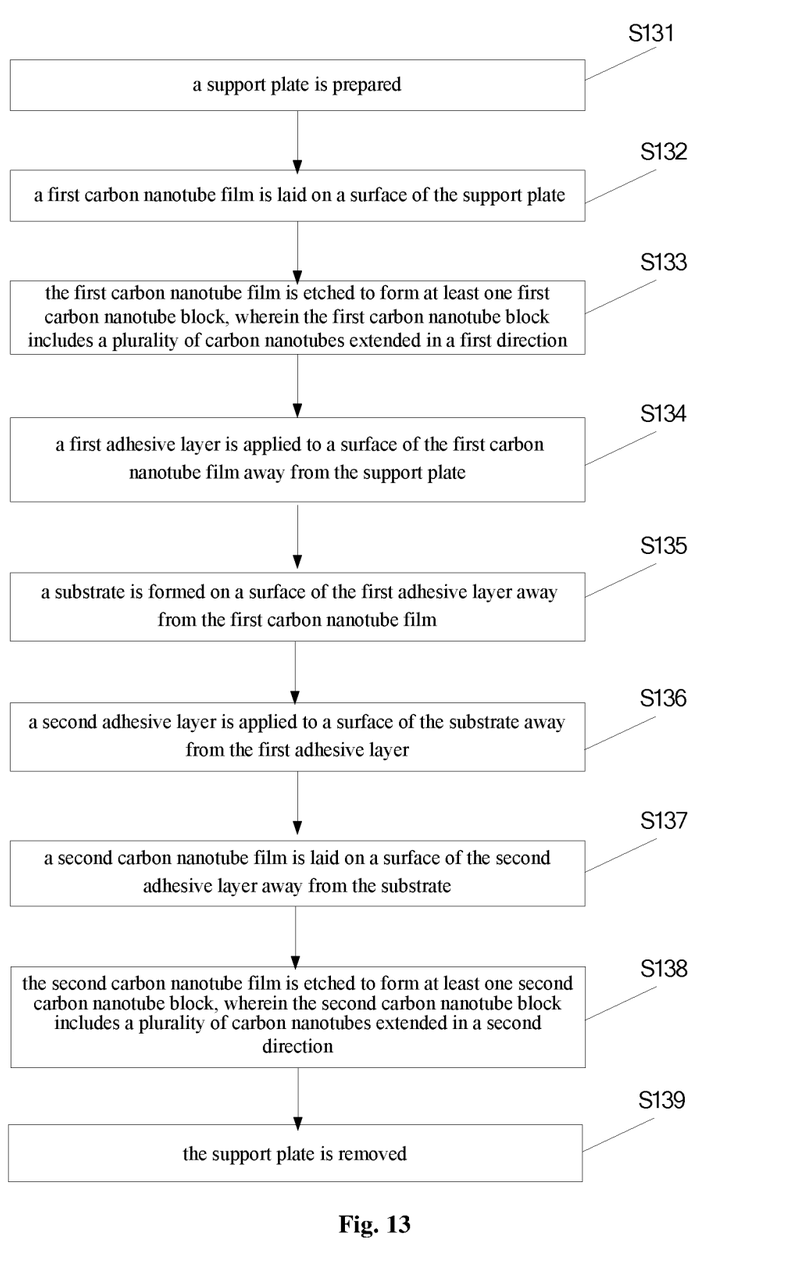
FIG. 13 is a flowchart of a method for fabricating a regional polarization structure according to an embodiment of the present disclosure.

In another embodiment of the present disclosure, as shown in FIG. 13, a method for fabricating a regional polarization structure includes steps of step S131 to step S139, and the method is not limited to this sequence.

In step S131, a support plate is prepared.

In step S132, a first carbon nanotube film is laid on a surface of the support plate.

In step S133, the first carbon nanotube film is etched to form at least one first carbon nanotube block, wherein the first carbon nanotube block includes a plurality of carbon nanotubes extended in a first direction.

In step S134, a first adhesive layer is applied to a surface of the first carbon nanotube film away from the support plate.

In step S135, a substrate is formed on a surface of the first adhesive layer away from the first carbon nanotube film.

In step 136, a second adhesive layer is applied to a surface of the substrate away from the first adhesive layer.

In step 137, a second carbon nanotube film is laid on a surface of the second adhesive layer away from the substrate.

In step 138, the second carbon nanotube film is etched to form at least one second carbon nanotube block, wherein the second carbon nanotube block includes a plurality of carbon nanotubes extended in a second direction.

In step S139, the support plate is removed.

A projection of the first carbon nanotube block on the substrate is not overlapped with a projection of the second carbon nanotube block on the substrate, and the first direction is not parallel with the second direction.

It should be noted that, based on any embodiment above, in an embodiment of the present disclosure, in the case that the first adhesive layer is made of the photo-alignment base material, the step of applying a first adhesive layer to a first lateral surface of the substrate may include: dissolving the photo-alignment base material or its precursor solution into a solvent to obtain a photo-alignment base material or its precursor solution having a preset concentration; and applying the photo-alignment base material or its precursor solution having the preset concentration on the first lateral surface of the substrate, by means of a whirl glue method or a spin coating method. It should be noted that, in the embodiments of the present disclosure, the preset concentration may be determined based on the actual requirement, which is not limited in the present disclosure. Optionally, a thickness of the first adhesive layer ranges from 100 nanometers to 100 micrometers, which is not limited in the present disclosure and depends on specific cases.

Based on any embodiment above, in an embodiment of the present disclosure, in the case that the first adhesive layer is made of the photo-alignment base material, the first adhesive layer is doped with a dichroic dye. In the embodiment, before the first carbon nanotube film is etched, the method further includes: irradiating the first carbon nanotube film with polarized ultraviolet light. In this way, the dichroic dye in the first adhesive layer has a certain orientation, thereby ensuring that the orientation of the dichroic dye in the first adhesive layer is the same as an orientation of the first adhesive layer and an extension direction of carbon nanotubes in the first carbon nanotube film.

Similarly, in another embodiment of the present disclosure, in the case that the second adhesive layer is made of the photo-alignment base material, the second adhesive layer is doped with a dichroic dye. In the embodiment, before the second carbon nanotube film is etched, the method further includes: irradiating the second carbon nanotube film with polarized ultraviolet light. In this way, the dichroic dye in the second adhesive layer has a certain orientation, thereby ensuring that the orientation of the dichroic dye in the second adhesive layer is the same as an orientation of the second adhesive layer and an extension direction of carbon nanotubes in the second carbon nanotube film.

In still another embodiment of the present disclosure, in the case that both the first adhesive layer and the second adhesive layer are made of the photo-alignment base material, the first adhesive layer is doped with a dichroic dye and the second adhesive layer is also doped with a dichroic dye. In the embodiment, before the first carbon nanotube film is etched, the method further includes: irradiating the first carbon nanotube film with polarized ultraviolet light. Furthermore, before the second carbon nanotube film is etched, the method further includes: irradiating the second carbon nanotube film with polarized ultraviolet light. In this way, the orientation of the dichroic dye in the first adhesive layer is the same as the orientation of the first adhesive layer, and the orientation of the dichroic dye in the second adhesive layer is the same as the orientation of the second adhesive layer.

Figure 14:
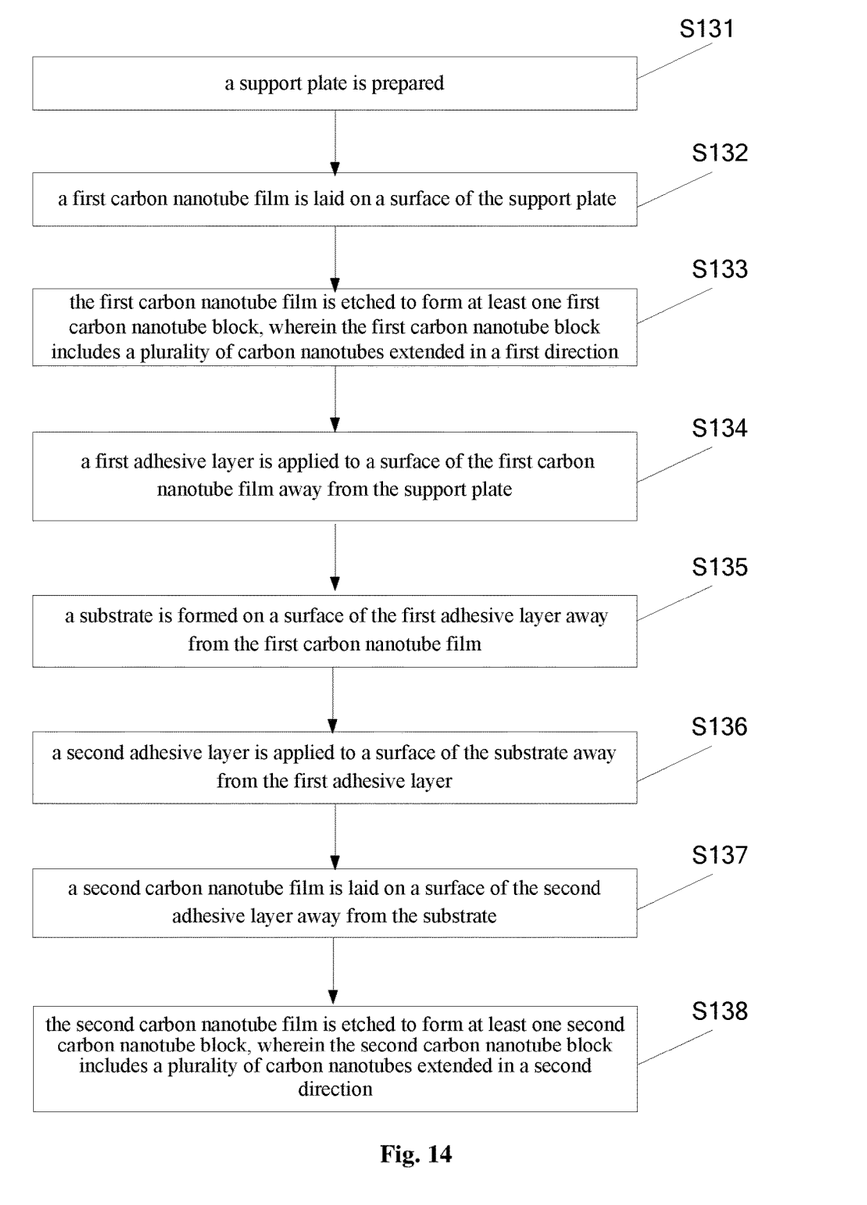
FIG. 14 is a flowchart of a method for fabricating a regional polarization structure according to embodiment of the present disclosure.

In still another embodiment of the present disclosure, the regional polarization structure includes a support plate. As shown in FIG. 14, in the embodiment, a method for fabricating a regional polarized structure includes steps of step S131 to step S138, and the method is not limited to this sequence.

In step S131, a support plate is prepared.

In step S132, a first carbon nanotube film is laid on a surface of the support plate.

In step S133, the first carbon nanotube film is etched to form at least one first carbon nanotube block, wherein the first carbon nanotube block includes a plurality of carbon nanotubes extended in a first direction.

In step S134, a first adhesive layer is applied to a surface of the first carbon nanotube film away from the support plate.

In step S135, a substrate is formed on a surface of the first adhesive layer away from the first carbon nanotube film.

In step 136, a second adhesive layer is applied to a surface of the substrate away from the first adhesive layer.

In step 137, a second carbon nanotube film is laid on a surface of the second adhesive layer away from the substrate.

In step 138, the second carbon nanotube film is etched to form at least one second carbon nanotube block, wherein the second carbon nanotube block includes a plurality of carbon nanotubes extended in a second direction.

A projection of the first carbon nanotube block on the substrate is not overlapped with a projection of the second carbon nanotube block on the substrate, and the first direction is not parallel with the second direction.

Based on any embodiment above, in an embodiment of the present disclosure, in the case that the first adhesive layer is made of a photo-alignment base material, the first adhesive layer is doped with a dichroic dye. In the embodiment, before the first carbon nanotube film is etched, the method further includes: irradiating the first carbon nanotube film with polarized ultraviolet light. In this way, the dichroic dye in the first adhesive layer has a certain orientation, thereby ensuring that the orientation of the dichroic dye in the first adhesive layer is the same as an orientation of the first adhesive layer and an extension direction of carbon nanotubes in the first carbon nanotube film.

Similarly, in another embodiment of the present disclosure, in the case that the second adhesive layer is made of a photo-alignment base material, the second adhesive layer is doped with a dichroic dye. In the embodiment, before the second carbon nanotube film is etched, the method further includes: irradiating the second carbon nanotube film with ultraviolet polarization light. In this way, the dichroic dye in the second adhesive layer has a certain orientation, thereby ensuring the orientation of the dichroic dye in the second adhesive layer is the same as an orientation of the second adhesive layer and an extension direction of carbon nanotubes in the second carbon nanotube film.

In still another embodiment of the present disclosure, in the case that both the first adhesive layer and the second adhesive layer are made of a photo-alignment base material, the first adhesive layer is doped with a dichroic dye and the second adhesive layer is also doped with a dichroic dye. In the embodiment, before the first carbon nanotube film is etched, the method further includes: irradiating the first carbon nanotube film with polarized ultraviolet light. Furthermore, before the second carbon nanotube film is etched, the method further includes: irradiating the second carbon nanotube film with polarized ultraviolet light. In this way, the orientation of the dichroic dye in the first adhesive layer is the same as an orientation of the first adhesive layer, and the orientation of the dichroic dye in the second adhesive layer is the same as an orientation of the second adhesive layer.

In the method for fabricating the regional polarization structure according to the embodiments of the present disclosure, the first carbon nanotube block and the second carbon nanotube block are formed respectively on two opposite sides of the substrate; the first carbon nanotube block includes multiple carbon nanotubes extended in the first direction, the second carbon nanotube block includes multiple carbon nanotubes extended in the second direction, and the first direction is different from the second direction, i.e., the first carbon nanotube block and the second carbon nanotube block have different alignment directions. In this way, the regional polarized structure has different alignments at different regions, and thereby a liquid crystal display panel including the regional polarized structure has different alignments at different regions, so as to meet the requirement of different alignments at different positions of the liquid crystal display panel, and solve the problem of preventing the liquid crystal display panel from improving a display quality due to the same alignment direction at various positions of the alignment layer of the existing liquid crystal display panel.

In addition, in a method for fabricating a regional polarization structure according to an embodiment of the present disclosure, the substrate is fixedly banded to the first carbon nanotube block via the first adhesive layer, thereby increasing a banding strength between the substrate and the first carbon nanotube block, and enhancing firmness between the substrate and the first carbon nanotube block.

Similarly, in a method for fabricating a regional polarization structure according to an embodiment of the present disclosure, the substrate is fixedly bonded to the second carbon nanotube block via the second adhesive layer, thereby increasing a bonding strength between the substrate and the second carbon nanotube block, and enhancing firmness between the substrate and the second carbon nanotube block.

Various parts of the specification are described in a progressive way, and each part lays emphasis on differences from other parts. For the same or similar parts between various parts, one may refer to the description of other parts.

According to the above description of the disclosed embodiments, those skilled in the art can implement or practice the present disclosure. Many changes to these embodiments are apparent for those skilled in the art, and general principles defined herein may be implemented in other embodiments without departing from the spirit or scope of the present disclosure. Hence, the present disclosure is not limited to the embodiments disclosed herein, but is to conform to the widest scope in accordance with the principles and novel features disclosed herein.

The invention claimed is:

1. A regional polarization structure, comprising:
   a substrate;
   at least one first carbon nanotube block arranged on a first side of the substrate, wherein the at least one first carbon nanotube block comprises a plurality of carbon nanotubes extended in a first direction;
   a first adhesive layer arranged between the substrate and the at least one first carbon nanotube block, and configured to fixedly connect the substrate with the at least one first carbon nanotube block;
   at least one second carbon nanotube block arranged on a second side of the substrate, wherein the at least one second carbon nanotube block comprises a plurality of carbon nanotubes extended in a second direction, and the second side is a side of the substrate opposite to the first side; and
   a second adhesive layer arranged between the substrate and the at least one second carbon nanotube block, and configured to fixedly connect the substrate with the at least one second carbon nanotube block,
   wherein a projection of the at least one first carbon nanotube block on the substrate is not overlapped with a projection of the at least one second carbon nanotube block on the substrate, and the first direction is not parallel with the second direction.

2. The regional polarization structure according to claim 1, wherein at least one of the first adhesive layer and the second adhesive layer is made of a photo-alignment base material.

3. The regional polarization structure according to claim 2, wherein an orientation of the photo-alignment base material is the same as an extension direction of carbon nanotubes in a carbon nanotube block corresponding to the photo-alignment base material.

4. The regional polarization structure according to claim 3, wherein the photo-alignment base material is doped with a dichroic dye, and a polarization direction of the dichroic dye is the same as the orientation of the photo-alignment base material.

5. The regional polarization structure according to claim 4, wherein a dichroic ratio of the dichroic dye is not less than 7.

6. The regional polarization structure according to claim 5, wherein the dichroic dye comprises one or more of an azo dye, an anthraquinone dye, a biphenyl dye, a triphendioxazine and derivative dye, a monomethine dye, a polymethine dye and a polycyclic dye.

7. The regional polarization structure according to claim 1, wherein an angle between the first direction and the second direction is 90 degrees.

8. The regional polarization structure according to claim 1, wherein the substrate has a transparent insulation structure or a translucent insulation structure.

9. The regional polarization structure according to claim 8, wherein the substrate is made of an insulation oxide.

10. The regional polarization structure according to claim 9, wherein the insulation oxide is silicon dioxide.

11. The regional polarization structure according to claim 1, wherein the photo-alignment base material is made of one or more of a cellulose triacetate, a polyimide and a polyamide acid.

12. A method for fabricating a regional polarization structure, wherein the method comprises:
    preparing a substrate;
    applying a first adhesive layer to a first lateral surface of the substrate;
    disposing a first carbon nanotube film on a side of the first adhesive layer away from the substrate;
    etching the first carbon nanotube film to form at least one first carbon nanotube block, wherein the at least one first carbon nanotube block comprises a plurality of carbon nanotubes extended in a first direction;
    applying a second adhesive layer to a second lateral surface of the substrate, wherein the second lateral surface is a side of the substrate opposite to the first lateral surface;
    disposing a second carbon nanotube film on a side of the second adhesive layer away from the substrate; and
    etching the second carbon nanotube film to form at least one second carbon nanotube block, wherein the at least one second carbon nanotube block comprises a plurality of carbon nanotubes extended in a second direction,
    wherein a projection of the at least one first carbon nanotube block on the substrate is not overlapped with a projection of the at least one second carbon nanotube block on the substrate, and the first direction is not parallel with the second direction.

13. The method according to claim 12, wherein the first adhesive layer is doped with a dichroic dye, and before the etching the first carbon nanotube film, the method further comprises: irradiating the first carbon nanotube film with polarized ultraviolet light.

14. The method according to claim 12, wherein the second adhesive layer is doped with a dichroic dye, and before the etching the second carbon nanotube film, the method further comprises: irradiating the second carbon nanotube film with polarized ultraviolet light.

15. A method for fabricating a regional polarization structure, wherein the method comprises:
    preparing a support plate;
    laying a first carbon nanotube film on a surface of the support plate;
    etching the first carbon nanotube film to form at least one first carbon nanotube block, wherein the at least one first carbon nanotube block comprises a plurality of carbon nanotubes extended in a first direction;
    applying a first adhesive layer to a surface of the first carbon nanotube film away from the support plate;

forming a substrate on a surface of the first adhesive layer away from the first carbon nanotube film;
applying a second adhesive layer to a surface of the substrate away from the first adhesive layer;
laying a second carbon nanotube film on a surface of the second adhesive layer away from the substrate; and
etching the second carbon nanotube film to form at least one second carbon nanotube block, wherein the at least one second carbon nanotube block comprises a plurality of carbon nanotubes extended in a second direction,
wherein a projection of the at least one first carbon nanotube block on the substrate is not overlapped with a projection of the at least one second carbon nanotube block on the substrate, and the first direction is not parallel with the second direction.

16. The method according to claim 15, further comprising: removing the support plate.

17. A liquid crystal display panel, comprising at least one regional polarization structure, wherein the regional polarization structure comprises:
a substrate;
at least one first carbon nanotube block arranged on a first side of the substrate, wherein the at least one first carbon nanotube block comprises a plurality of carbon nanotubes extended in a first direction;
a first adhesive layer arranged between the substrate and the at least one first carbon nanotube block, and configured to fixedly connect the substrate with the at least one first carbon nanotube block;
at least one second carbon nanotube block arranged on a second side of the substrate, wherein the at least one second carbon nanotube block comprises a plurality of carbon nanotubes extended in a second direction, and the second side is a side of the substrate opposite to the first side; and
a second adhesive layer arranged between the substrate and the at least one second carbon nanotube block, and configured to fixedly connect the substrate with the at least one second carbon nanotube block,
wherein a projection of the at least one first carbon nanotube block on the substrate is not overlapped with a projection of the at least one second carbon nanotube block on the substrate, and the first direction is not parallel with the second direction.

18. The liquid crystal display panel according to claim 17, wherein at least one of the first adhesive layer and the second adhesive layer is made of a photo-alignment base material.

19. The liquid crystal display panel according to claim 18, wherein an orientation of the photo-alignment base material is the same as an extension direction of carbon nanotubes in a carbon nanotube block corresponding to the photo-alignment base material.

20. The liquid crystal display panel according to claim 19, wherein the photo-alignment base material is doped with a dichroic dye, and a polarization direction of the dichroic dye is the same as the orientation of the photo-alignment base material.

* * * * *